Aug. 2, 1966  F. P. THOMAS  3,263,596
FILTERED DEEP FRYER
Filed Aug. 31, 1964

INVENTOR.
FRANK P. THOMAS
BY
*Lockwood, Woodard, Smith & Weikart*
Attorneys

United States Patent Office 3,263,596
Patented August 2, 1966

3,263,596
FILTERED DEEP FRYER
Frank P. Thomas, 504 W. 83rd St., Indianapolis, Ind.
Filed Aug. 31, 1964, Ser. No. 393,115
5 Claims. (Cl. 99—408)

This invention relates generally to deep fryers and particularly to deep fryer vessel having means for fine-filtering the fat used in the vessel during the operation of the fryer.

Early types of deep fryers customarily located the burner or heating element for heating the frying fat in the fryer vessel at a point generally adjacent the base of the vessel. Since the hottest portion of the vessel was thus generally at the lowest surface of the vessel, any food particles dropping into the fat, from the fryer baskets for example, dropped to the base of the vessel. The high temperature grease at this base portion of the vessel rapidly charred or carbonized the particles so dislodged. These then discolored the fat and often adversely affected the taste of foods cooked in the fryer. To meet this problem, screens (of relatively wide mesh so as not to impede the convectional circulation of fat within the vessel) were utilized to restrain dislodged food particles from settling to the heated base of the vessel. An example of such prior art deep fryer construction can be found in U.S. Patent 2,061,533.

Modern operation of commercial deep fryers requires that the fat used in the fryers be kept free of food particles to prevent discoloration of the cooking fat and contamination of the fat by unwanted tastes and odors. Present-day requirements in this regard are quite stringent and more than the mere prior-art screening of food particles from the base of the fryer is necessary. Substitution of fine filters for screens in the prior art fryers has not been feasible because these cut down the required rapid circulation of the fat between the heated surface of the vessel and the food to be cooked suspended in the vessel. An alternative is to provide a pump and filter for the fat separate from and exteriorly of the deep fryer apparatus. Suitable piping from the fryer vessel permits fat, drawn by the pump, to be forced through a fine filter and returned to the vessel. Such arrangements are costly. An example of this separate-pump solution to the problem is disclosed in U.S. Patent 2,578,129.

To improve heat transfer and to alleviate the fat discoloration and contamination problem, more recent deep fryers utilize heat exchange or combustion tubes which extend through the fat in the fryer vessel. This arrangement eliminates heating of the base of the vessel and dislodged food particles, settling to the base, thus are not accumulated at the surface of highest temperature. An example of this type of deep fryer construction is shown in U.S. Patent 2,712,308. Use of fine filters in even this more refined deep fryer type has presented difficulties since the filters, in the main circulatory path of the cooking flow of fat, tend to destroy the heat balance of the system by impeding circulation and thereby causing overheating of the fat. Since the filters extend across the path of cooking flow of the fat, if the filters become clogged, circulation of the fat ceases and a rapid rise of the temperature of the fat to its ignition point can occur, with attendant fire and smoke damage to the equipment.

It is the primary object of the present invention to provide a deep fryer apparatus which can effectively and safely accommodate fine screen filters for the fat with the filters having no effect on the normal path for cooking flow of heated fat.

A further object of the present invention is to provide a deep fryer apparatus of the type referred to above in which accidental clogging of the filter will not destroy the circulation of the main body of cooking fat.

A further object of the present invention is to provide a deep fryer apparatus of the type referred to above in which the required pressure differential across the face of the filter is maintained without expenditure of large amounts of heat.

The above objects are accomplished by providing the deep fryer fat accommodating vessel with a heat barrier in its interior, spaced somewhat from the inner faces of the vessel walls. The relatively narrow space thus provided near the vessel side walls extends substantially the full depth of the vessel, the upper margin of the barrier wall being somewhat below the normal cooking level of fat in the vessel and the lower margin of the barrier being disposed above the base of the vessel. This space provides an alternate circulation path for the fat in addition to the main heat transfer path to the food in the central portion of the vessel. This alternate path has fine filters extending across it which remove undersired particles from the portion of the fat moving through the alternate circulation path without destroying the heat balance of or adversely affecting the flow of fat in the main circulatory path. When desirable the pressure differential across the filters in the alternate path may be increased by cooling the surfaces bounding the localized area of the alternate path. One form of such cooling provides either convection or forced circulation of cooling air about the exterior surface portion of the vessel which, with the barrier wall, defines the alternate circulatory path.

A physical embodiment of the invention is illustrated in the accompanying drawings in which.

Figure 1:
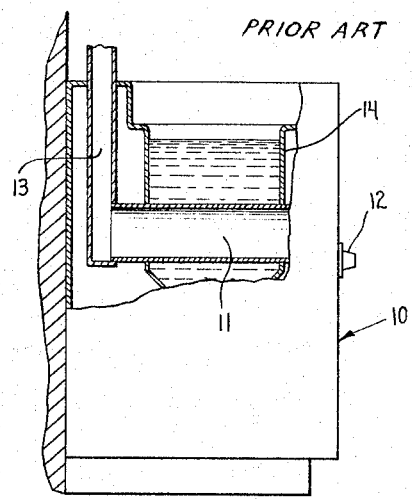
FIG. 1 is a side view, partially in section, illustrating the environment of the structure of the present invention.

Referring initially to FIG. 1, there is shown a deep frying apparatus of generally conventional construction in which a housing or cabinet 10 accommodates gas burners and a manifold or other heating means adjacent a series of generally horizontal combustion tubes 11. The control knob 12 for adjusting the fuel input to the gas burners or similar heating means is accessible from the exterior of the cabinet. The combustion tubes 11 communicate with a central flue 13 which carries off the products of combustion. The combustion tubes 11 extend in sealed relation through the side walls of a cooking vessel 14 adapted to be filled with cooking fat and open at its upper end permitting the insertion of fry baskets containing food to be cooked in the vessel.

Figure 2:
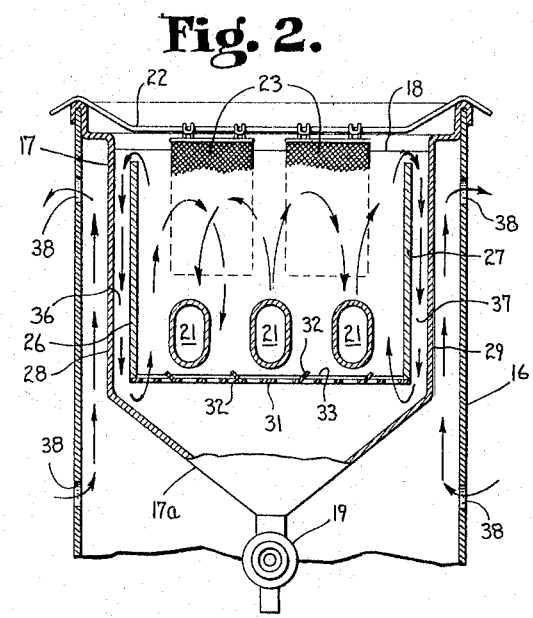
FIG. 2 is a side sectional view illustrating the apparatus of the present invention.
Figure 3:
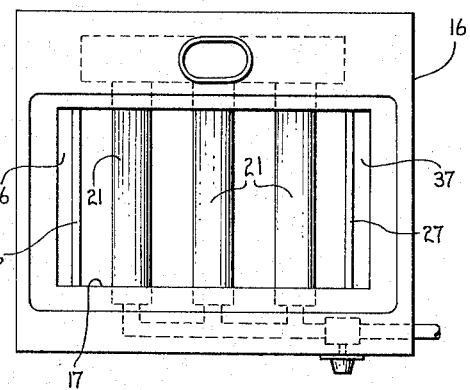
FIG. 3 is a top plan view of the apparatus shown in FIG. 2 but omitting the fry baskets shown in FIG. 2.

As previously mentioned, the present invention is embodied in an improved vessel for use in the typical, commercial deep fryer illustrated in FIG. 1. Referring specifically to FIGS. 2 and 3, the cabinet 16 (counterpart of the cabinet 10 of FIG. 1) supports therein a cooking vessel 17 containing cooking fat or oil at the level indicated at 18. The vessel 17 is generally rectangular in cross section over a substantial portion of its depth and its lower portion 17a is tapered downwardly to provide a suitable sump permitting drainage of the cooking fat therefrom when desired by means of the valve 19.

Heating means taking the form of combustion tubes 21 (the counterparts of the combustion tubes 11 of FIG. 1) extend transversely across the vessel at the rectangular portion thereof. The passage of hot gases, products of combustion, through the tubes 21 serves to maintain the cooking fat at the desired temperature. The vessel is adapted to accommodate, by means of brackets 22 or other similar means the fry baskets 23 which serve to suspend food to be cooked within the cooking fat in the vessel.

As will be evident from the arrows in FIG. 2, when the baskets 23, containing food at room temperature, are lowered into the vessel, a primary, convection circulating path for the cooking fat is established between the baskets and the area adjacent each of the tubes 21.

Thermal barrier plates 26 and 27, disposed in the generally rectangular cross sectioned portion of the vessel 17 extend from side to side of the vessel and are generally parallel with but spaced slightly from opposite vessel side walls 28 and 29, respectively. As will be evident from FIG. 2, the upper margins of the barrier plates 26 and 27 are below the normal level of cooking fat within the vessel, and the lower margins of the barrier plates are spaced above the bottom of the vessel.

Extending horizontally across the vessel at the lower margins of the barrier plates 26 and 27 is a filter supporting screen 31. The screen 31 has barbed hooks 32 extending upwardly therefrom which serve to hold in place against the screen a sheet of fine filter material such as a filter paper 33. It will be understood that filter means other than that illustrated in FIG. 2 might be utilized and that other means might be used for maintaining the filter paper in place on the screen 31 might be utilized.

In operation, with the heating means cycling so as to maintain the desired temperature of the cooking fat within the vessel, when fry baskets are inserted into the hot fat, a primary convection path for the cooking fat will be established between the heating means and the baskets as previously mentioned and as illustrated by arrows in FIG. 2. While the food in the baskets 23 is cooking and a substantial temperature differential exists between the food material and the fat adjacent the heating means, the convection circulation through the primary path will be quite pronounced and will encompass in its flow substantially all of the cooking fat within the vessel. During these cooking periods, but primarily during the intervals when no food is being cooked or when the heating means is in the off portion of its cycle, a small amount of the cooking fat overflows outboard of the upper margins of the barrier plates 26 and 27. This auxiliary convection path for the cooking oil (indicated at 36 and 37 in FIG. 2) is established as the cooking fat between the barrier plates and the adjacent vessel side walls cools and falls to the lower margins of the barrier plates. Here the oil is drawn back up, through the screen 31 and the filter element 33, to an area adjacent the heating means 21 to again be heated and enter the primary circulation path.

It will thus be evident that as the fryer is operated, a portion of the cooking fat is diverted from the primary circulation path into the auxiliary filtering path and is filtered before its reentry into the central portion of the vessel. If desirable, the temperature of the cooking fat within the auxiliary paths 36 and 37 may be additionally lowered, thus increasing the pressure differential across the filter element 33, by circulating cool air through apertures 38 in the cabinet 16 as indicated by arrows in FIG. 2.

Figure 4:
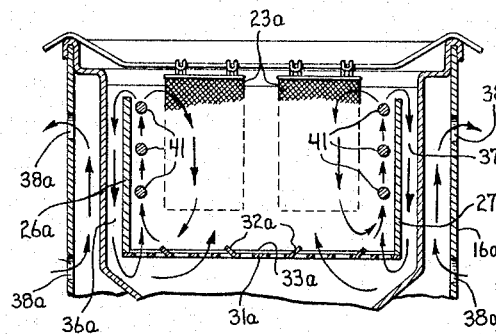
FIG. 4 is a side sectional view similar to FIG. 2, but illustrating a modified form of the apparatus of the present invention.
Figure 5:
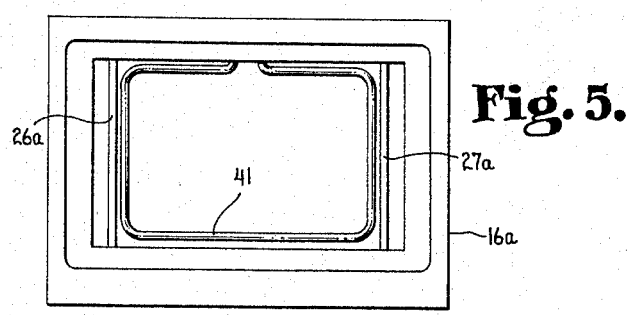
FIG. 5 is a top plan view of the apparatus shown in FIG. 4, but omitting the fry baskets shown in FIG. 4.

Referring now to FIGS. 4 and 5, a modified form of the arrangement of FIGS. 2 and 3 is illustrated. In FIGS. 4 and 5 components having counterparts in FIGS. 2 and 3 are given the same reference numerals as in FIGS. 2 and 3 but with the suffix "a." The difference in the arrangement of the structure of FIGS. 4 and 5 as compared to that of FIGS. 2 and 3 is primarily that metal sheathed, electrical heating elements are utilized as the heating means, such heating elements being identified at 41 in FIG. 4. The arrangement of the heating elements is such that, with the fry baskets 23a installed in the vessel, the main circulatory path between the heating means and the baskets is as illustrated in FIG. 4 by arrows.

The barrier plates 26a and 27a define, with the adjacent sides of the vessel, an auxiliary circulation path for the cooking fat, the auxiliary path being indicated at 36a and 37a. The filter element 33a is disposed across this auxiliary circulation path as was the case in the structure of FIG. 2. Apertures 38a in the shell 16a permit cooling of the vessel side walls adjacent the auxiliary circulation paths 36a and 37a. The operation of the structure of FIGS. 4 and 5 is identical to that of the structure of FIGS. 2 and 3.

It will be noted that in the structure of the present invention the rate of flow of the cooking fat through the filters is relatively low and that this filtering action taking place in the auxiliary circulation path does not adversely affect the rate of heat transfer occurring within the cooking area, that is, in the primary circulating path between the heating means and the food to be cooked. Because of the general lowering of the temperature of the fat in the area adjacent the food being cooked during the actual cooking periods, the amount of fat flowing into the auxiliary, filtering path is reduced to a minimum, but as the cooking fat returns to operating temperature during the recovery period between cooking cycles, the filtering action increases as a somewhat additional amount of oil then flows through the auxiliary filtering path. Since the filtering path is an alternate path, if the filter becomes clogged, the flow of oil in the primary cooking path is not interrupted and the oil is not raised to dangerous temperatures. Because the filtering is done in an auxiliary, separate path from the cooking path, the fat in this auxiliary path may be cooled (by the provision of cooling air circulation as shown herein, for example) and the differential pressure across the filter may be thus increased permitting the use of very fine filtering elements. Since the rate of flow of cooking fat through the auxiliary filtering path is small in pounds of cooking fat per hour, only a relatively small amount of heat need be dissipated to achieve good filtering action; whereas, if all the oil were made to pass through the filter element to complete the cooking cycle, an arrangement utilized in the prior art, relatively large amounts of heat would be dissipated in order to provide the pressure differential across the filter required to circulate the cooking fat through the relatively fine filter.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A deep fryer vessel which is generally rectangular in cross-section over a substantial portion of its depth, heating means extending transversely across said vessel in said rectangular portion for the heating of cooking fat accommodated therein, said vessel being adapted to accommodate fry baskets for suspending food to be cooked adjacent said heating means thereby establishing a primary convection circulating path for cooking fat within the vessel, and a thermal barrier plate disposed adjacent each of two opposite side walls of said vessel but spaced from said vessel side walls, the upper margins of said barrier plates being below the normal level of cooking fat within the vessel and the lower margins of the barrier plates being spaced above the bottom of said vessel, and a fine filter element extending between said barrier plates across said vessel and below said heating means, whereby an auxiliary path for convection circulation of cooking fat is provided between said barrier plates and the adjacent faces of the vessel side walls to the interior of said vessel with said filter element extending across said auxiliary path but leaving said primary circulating path unobstructed.

2. A deep fryer apparatus as claimed in claim 1 having means for cooling the vessel side walls adjacent said thermal barrier plates.

3. A deep fryer vessel having side walls and a base, heating means extending transversely across said vessel for the heating of cooking fat accommodated therein, said vessel being adapted to accommodate fry baskets for suspending food to be cooked adjacent said heating means thereby establishing a primary convection circulating path for cooking fat within the vessel, and a thermal barrier plate disposed adjacent each of two opposite side walls of said vessel but spaced from said vessel side walls, the upper margins of said barrier plates being below the normal level of cooking fat within the vessel and the lower margins of the barrier plates being spaced above the base of said vessel, and a fine filter element extending between said barrier plates across said vessel and below said heating means, whereby an auxiliary path for convection circulation of cooking fat is provided between said barrier plates and the adjacent faces of the vessel side walls to the interior of said vessel with said filter element extending across said auxiliary path but leaving said primary circulating path unobstructed.

4. A deep fryer vessel which is generally rectangular in cross-section over a substantial portion of its depth, heating means extending transversely across said vessel in said rectangular portion for the heating of cooking fat accommodated therein, said vessel being adapted to accommodate fry baskets for suspending food to be cooked adjacent said heating means thereby establishing a primary convection circulating path for cooking fat within the vessel, and a thermal barrier plate disposed adjacent at least one of the side walls of said vessel but spaced from said vessel side wall, the upper margins of said barrier plate being below the normal level of cooking fat within the vessel and the lower margins of the barrier plate being spaced above the bottom of said vessel, and a fine filter element extending from said barrier plate, whereby an auxiliary path for convection circulation of cooking fat is provided between said barrier plate and the adjacent face of the vessel side wall to the interior of said vessel with said filter element extending across said auxiliary path but leaving said primary circulating path unobstructed.

5. A deep fryer vessel having side walls and a base, heating means extending transversely across said vessel for the heating of cooking fat accommodated therein, said vessel being adapted to accommodate fry baskets for suspending food to be cooked adjacent said heating means thereby establishing a primary convection circulating path for cooking fat within the vessel, and a thermal barrier plate disposed adjacent at least one of the side walls of said vessel but spaced from said vessel side wall, the upper margins of said barrier plate being below the normal level of cooking fat within the vessel and the lower margins of the barrier plate being spaced above the base of said vessel, and a fine filter element extending from said barrier plate, whereby an auxiliary path for convection circulation of cooking fat is provided between said barrier plate and the adjacent face of the vessel side wall to the interior of said vessel with said filter element extending across said auxiliary path but leaving said primary circulating path unobstructed.

References Cited by the Examiner

UNITED STATES PATENTS

| | | | |
|---|---|---|---|
| 1,234,131 | 7/1917 | Cleveland | 99—408 X |
| 2,061,533 | 11/1936 | Anetsberger | 99—408 |
| 2,154,391 | 4/1939 | Anderson | 99—408 |
| 2,219,949 | 10/1940 | Childs | 99—408 |
| 2,535,905 | 12/1950 | Dawson | 99—408 |
| 2,578,129 | 12/1951 | Daugherty | 99—408 |
| 2,652,767 | 9/1953 | Childs | 99—408 |

WALTER A. SCHEEL, *Primary Examiner.*